United States Patent
Yue et al.

(10) Patent No.: US 11,050,246 B2
(45) Date of Patent: Jun. 29, 2021

(54) STARTING METHOD AND STARTING DEVICE

(71) Applicant: CONTEMPORARY AMPEREX TECHNOLOGY CO., LIMITED, Ningde (CN)

(72) Inventors: Hongliang Yue, Ningde (CN); Zhili Wei, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 864 days.

(21) Appl. No.: 15/709,684

(22) Filed: Sep. 20, 2017

(65) Prior Publication Data

US 2018/0083445 A1 Mar. 22, 2018

(30) Foreign Application Priority Data

Sep. 20, 2016 (CN) .......................... 201610832957.1

(51) Int. Cl.
*H02J 1/00* (2006.01)
*H02J 15/00* (2006.01)
*H02J 7/00* (2006.01)

(52) U.S. Cl.
CPC ............... *H02J 1/00* (2013.01); *H02J 15/00* (2013.01); *H02J 7/0063* (2013.01); *H02J 7/0068* (2013.01)

(58) Field of Classification Search
CPC .. H02J 1/00; H02J 15/00; H02J 7/0063; H02J 7/0068

USPC .......................................... 307/130; 320/160
See application file for complete search history.

(56) References Cited

U.S. PATENT DOCUMENTS

| 6,091,229 A | * | 7/2000 | Oglesbee | ............... H02J 7/022 320/137 |
| 2013/0051084 A1 | * | 2/2013 | Hachiya | ............ H02M 3/33507 363/21.01 |
| 2014/0184172 A1 | * | 7/2014 | Momo | ...................... H02J 7/00 320/160 |

FOREIGN PATENT DOCUMENTS

| CN | 101803143 A | | 8/2010 |
| KR | 20130003504 A | * | 1/2013 |

OTHER PUBLICATIONS

Office Action from corresponding Chinese Application No. 201610832957.1 dated Jul. 13, 2018.

* cited by examiner

*Primary Examiner* — Toan T Vu
(74) *Attorney, Agent, or Firm* — Tucker Ellis LLP

(57) ABSTRACT

Embodiments of the present application provide a starting method and a starting device. In an aspect, in the starting method provided by the embodiments of the present application, when an input voltage of an energy storage system meets a first specified condition, then judging whether the input voltage meets a second specified condition, if yes, then starting the energy storage system. Therefore, the technical solutions provided by the embodiments of the present application can solve the problems of poor starting efficiency and high cost in the prior art.

11 Claims, 3 Drawing Sheets

STARTING METHOD AND STARTING DEVICE

CROSS-REFERENCE TO RELATED APPLICATIONS

The present application claims the benefit of priority to Chinese Patent Application No. 201610832957.1, filed on Sep. 20, 2016, the content of which is incorporated herein by reference in its entirety.

TECHNICAL FIELD

The present application relates to the field of energy storage technologies and, more particular to a starting method and a starting device.

BACKGROUND

At present, an energy storage system has been widely applied to application scenarios such as communication base station and home energy storage. When the energy storage system is applied to a communication base station, self-starting of the energy storage system is especially important, since many base stations are established in remote areas or in mountain areas without convenient transportation. When the energy storage system must be restarted due to situations such as abnormal operation and the like, manual operation is needed to restart the energy storage system.

During implementation of the present application, the inventor has found at least the following problems exist in the prior art:

In the prior art, using a manual starting manner for the energy storage system presents poor starting efficiency and high cost.

SUMMARY

In view of the above, embodiments of the present application provide a starting method and a starting device, so as to solve the problems of poor starting efficiency and high cost in the prior art.

In an aspect, embodiments of the present application provide a starting method, including:

when an input voltage of an energy storage system meets a first specified condition, judging, by the energy storage system, whether the input voltage meets a second specified condition; and starting the energy storage system, in response to a condition that the input voltage meets the second specified condition.

Preferably, the first specified condition includes: the input voltage of the energy storage system fall into a specified voltage range.

Preferably, the second specified condition includes: the input voltage is maintained in the specified voltage range within a first specified duration.

Preferably, after starting the energy storage system, the method further includes:

detecting, by the energy storage system, whether the input voltage is abnormal.

Preferably, after detecting that the input voltage is abnormal, the method further includes:

performing, by the energy storage system, a protecting process; and/or, performing, by the energy storage system, an alarming process.

The above-described technical solutions have at least the following beneficial effects:

In the starting method provided by the embodiments of the present application, when an input voltage of an energy storage system meets a first specified condition, then judging whether the input voltage meets a second specified condition, if yes, then starting the energy storage system. In the embodiments of the present application, it can be automatically judged that whether the input voltage of the energy storage system meets the preset starting conditions, and if the input voltage of the energy storage system meets the preset starting conditions, the energy storage system will be automatically started. Such a process can be accomplished automatically without manual operation, which increases starting efficiency and, on the other hand, avoids labor cost caused by manual operation in the prior art. Therefore, the technical solution provided by the embodiments of the present application solves the problems of poor starting efficiency and high cost in the prior art.

In another aspect, embodiments of the present application provide a starting device, including:

a judging unit, configured to, when an input voltage of an energy storage system meets a first specified condition, judge whether the input voltage meets a second specified condition; and a starting unit, configured to start the energy storage system, in response to a condition that the input voltage meets the second specified condition.

Preferably, the first specified condition includes: the input voltage of the energy storage system falls into a specified voltage range.

Preferably, the second specified condition includes: the input voltage of the energy storage system is maintained in the specified voltage range within a first specified duration.

Preferably, the device further includes:

a detecting unit, configured to detect whether the input voltage is abnormal.

Preferably, the device further includes:

a first processing unit, configured to, after the detecting unit determines that the input voltage is abnormal, perform a protecting process; and/or, a second processing unit, configured to, after the detecting unit determines that the input voltage is abnormal, perform an alarming process.

The above-described technical solutions have at least the following beneficial effects:

In the starting device provided by the embodiments of the present application, the judging unit of the starting device is configured to, when an input voltage of an energy storage system meets a first specified condition, judge whether the input voltage meets a second specified condition, and the starting unit is configured to start the energy storage system, in response to a condition that the input voltage meets the second specified condition. In the embodiments of the present application, it can be automatically judged that whether the input voltage of the energy storage system meets the preset starting conditions, and if the input voltage of the energy storage system meets the preset starting conditions, the energy storage system will be automatically started. Such a process can be accomplished automatically without manual operation, which increases starting efficiency and, on the other hand, avoids labor cost caused by manual operation in the prior art. Therefore, the technical solution provided by the embodiments of the present application solves the problems of poor starting efficiency and high cost in the prior art.

BRIEF DESCRIPTION OF DRAWINGS

In order to more clearly illustrate technical solutions of embodiments of the present application, the accompanying drawings used in the embodiments will be briefly introduced hereinafter. Obviously, the drawings described are merely some of the embodiments of the present application, and on the basis of these drawings, those of ordinary skill in the art can also obtain other drawings without creative efforts.

DESCRIPTION OF EMBODIMENTS

For better understanding of technical solutions of the present application, embodiments of the present application will be illustrated in detail with reference to the accompanying drawings.

It should be understood that, the described embodiments are only a part of the embodiments, rather than all of them. Based on the embodiments of the present application, any other embodiments obtained by those of ordinary skill in the art shall fall in the protection scope of the present application.

The terms used in the embodiments of the present application are merely for the purpose of describing specific embodiments, rather than limiting the present application. The singular form "a", "an", "the" and "said" used in the embodiments and claims shall be interpreted as also including the plural form, unless otherwise clearly noted in the context.

It should be understood that, the term "and/or" used in the present application merely refers to a relation between associated objects, which includes three types of relations. For example, A and/or B refers to: (a) A exists alone; (b) A and B exist at the same time; or (c) B exists alone. In addition, the character "/" generally refers to an "or" relation.

It should be understood that, although expressions "first", "second", "third" etc. are used to describe specified conditions, they shall not be interpreted as limiting the specified conditions. These expressions are merely used to distinguish among the specified conditions. For example, without departing from the scope of the embodiment of the present application, a first specified condition can also be named as a second specified condition, and vice versa.

Depending on the context, the expression "if . . . " can be interpreted as "when . . . ", "while . . . ", "in response to determining . . . " or "in response to detecting . . . ". Similarly, depending on the context, the phrase "if . . . is determined" or "if . . . is detected" can also be interpreted as "when determining . . . ", "in response to determining . . . ", "when detecting . . . " or "in response to detecting . . . ".

Embodiment One

Embodiments of the present application provide a starting method, and the starting method is applied to an energy storage system, so as to achieve self-starting of the energy storage system.

In the present embodiment, the energy storage system can be connected with an electric device through wires, so as to supply electric energy to the electric device through the connected wires. The energy storage system can also be connected with a power supply device through wires, so that the power supply device can supply electric energy to the energy storage system through the connected wires.

Figure 1:
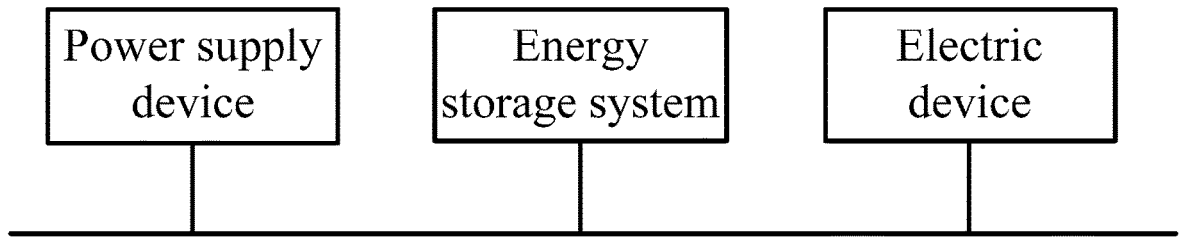
FIG. 1 is a schematic diagram showing a connection relation between an energy storage system and other devices.

For example, please refer to FIG. 1, which is a schematic diagram showing a connection relation between the energy storage system and other devices. As shown in FIG. 1, the energy storage system, the electric device and the power supply device can be connected with each other through a single wire. The power supply device can supply electric energy to the energy storage system and/or the electric device through the connected wire, and if the power supply device is powered off or in other situations that it cannot supply electric energy, the energy storage system can supply electric energy to the electric device through the connected wire.

In the present embodiment, the energy storage system can include, but not limited to, a physical energy storage system, a chemical energy storage system and an electromagnetic energy storage system. The present application does not limit the specific type of the energy storage system.

As an implementing manner, the power supply device can include, but not limited to, a power transformer, a mutual inductor, a device or facility for preventing overvoltage, a switch device, a power distribution device, a composite apparatus, an electric power circuit, a reactive power compensation device and the like.

As an implementing manner, the electric device can include, but not limited to, an electromechanical device, an electric heating device, an electric welding machine, a direct-current electric device, a direct-current power supply, cooling and air conditioning device, an electric traction device, an electrical lighting device and the like.

As an implementing manner, the wire shown in FIG. 1 can be a bus.

Specifically, when the energy storage system must be restarted due to situations such as abnormal operation and the like, the energy storage system will be powered off automatically. As an example, in the application scenario shown in FIG. 1, the power supply device can supply electric energy to the energy storage system and the electric device, and if power cut occurs, the power supply device cannot supply electric energy to the electric device, then the energy storage system can supply electric energy to the electric device. After a period of time, the energy storage system runs out of electric energy and is powered off automatically, then there is no current in the wire connecting the power supply device with the energy storage system, and the voltage is 0, that is, an input voltage of the energy storage system is 0. After being powered on, the power supply device can once again supply electric energy to the energy storage system and the electric device, at this moment, there exists a current in the wire connecting the power supply device with the energy storage system, and the input voltage of the energy storage system is not 0.

Therefore, in the present embodiment, it is judged whether the input voltage of the energy storage system meets a specified condition, and when the input voltage meets the specified condition, the energy storage system is automatically started.

Figure 2:
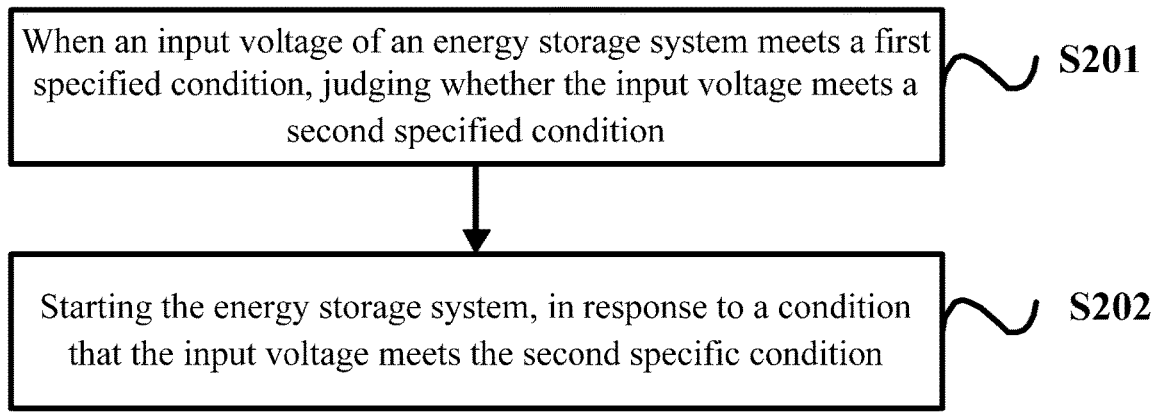
FIG. 2 is a first flow diagram of a starting method according to an embodiment of the present application.

Specifically, please refer to FIG. 2, which is a first flow diagram of a starting method according to the present embodiment of the present application. As shown in FIG. 2, the method includes steps as follows:

S201, when an input voltage of an energy storage system meets a first specified condition, judging whether the input voltage meets a second specified condition.

It should be understood that, in the present embodiment, the input voltage of the energy storage system is judged with respect to the first specified condition and the second specified condition, and only after the input voltage meets the first specified condition, it is further judged that whether the input voltage meets the second specified condition.

Specifically, the first specified condition includes: the input voltage of the energy storage system falls into a specified voltage range.

It should be noted that, in a condition that the input voltage of the energy storage system is smaller than a minimum voltage within a preset specified voltage range before the input voltage of the energy storage system meets the first specified condition, when it is satisfied that the input voltage of the energy storage system is equal to or greater than the minimum voltage of the specified voltage range, it is judged that whether the input voltage of the energy storage system meets the first specified condition. Alternatively, in a condition that the input voltage of the energy storage system is greater than a maximum voltage within the predetermined specified voltage range before the input voltage of the energy storage system meets the first specified condition, when it is satisfied that the input voltage of the energy storage system is equal to or smaller than the maximum voltage of the specified voltage range, it is judged that whether the input voltage of the energy storage system meets the first specified condition.

Specifically, the specified voltage range can refer to a voltage range allowable for operation of a charging circuit of the energy storage system. When the input voltage of the energy storage system falls into the specified voltage range, the charging circuit of the energy storage system can work, at this moment, other units of the energy storage system cannot work yet, and the energy storage system is still not started. The charging circuit is connected with a starting device of the energy storage system, and after the charging circuit begins to work, electric energy can be transferred to the starting device through the charging circuit. Therefore, whether the input voltage meets the second specified condition can be judged by the starting device of the energy storage system. In an implementation, the starting device can be arranged in a control unit of the energy storage system.

During practical implementation, the specified voltage range can be preset according to actual demands, it is possible to directly preset the minimum voltage of the specified voltage range, and then the maximum voltage of the specified range is a sum of the minimum voltage and a specified threshold. The minimum voltage of the specified voltage range can be a minimum voltage allowable for operation of the charging circuit of the energy storage system. For example, the minimum voltage of the specified voltage range can be 35V, and if the specified threshold is 0.5V, then the specified voltage range will be 35V-35.5V.

Specifically, in the present embodiment, the second specified condition includes: the input voltage of the energy storage system is maintained in the specified voltage range within a first specified duration. In the first specified duration, a difference between the input voltage of the energy storage system and the minimum voltage of the specified voltage range is greater than 0 and is not greater than the specified threshold.

Since the input voltage of the energy storage system may not be constant for all time, that is, the input voltage may fluctuate, and the preset specified voltage range is a voltage range allowable for operation of the charging circuit of the energy storage system. Therefore, after the first specified condition is satisfied, the charging circuit of the energy storage system can work, then the input voltage must be in the voltage range allowable for operation of the charging circuit within a certain duration and voltage fluctuation shall be small enough, so that the energy storage system can be automatically started. As a result, in the present embodiment, it is required that the input voltage of the energy storage system is maintained in the specified voltage range within the first specified duration.

It should be noted that, considering that the input voltage of the energy storage system may fluctuate, it is possible that, after meeting the first specified condition, the voltage value of the input voltage is not in the specified voltage range. Therefore, in a preferred implementation, the starting time of the first specified duration can be a time point when the input voltage of the energy storage system meets the first specified condition for a second time. Alternatively, in another implementation, the starting time of the first specified duration can be a time point when the input voltage of the energy storage system meets the first specified condition for a first time.

Therefore, to judge whether the input voltage of the energy storage system meets the second specified condition after the input voltage of the energy storage system meets the first specified condition, if the difference between the input voltage of the energy storage system and the minimum voltage of the specified voltage range is maintained between 0 and the specified threshold within the first specified duration, which means the input voltage is maintained in the specified voltage range within the first specified duration, then it is judged that the input voltage meets the second specified condition. Alternatively, if the difference between the input voltage of the energy storage system and the minimum voltage of the specified voltage range is not maintained between 0 and the specified threshold within the first specified duration, which means the input voltage is not maintained in the specified voltage range within the first specified duration, then it is judged that the input voltage does not meet the second specified condition.

Specifically, the first specified duration can be preset according to actual demands, for example, the first specified duration can be 2s.

S202, starting the energy storage system, in response to that the input voltage meets the second specified condition.

Specifically, in the present embodiment, when the input voltage of the energy storage system meets the second specified condition, the energy storage system will be automatically started, that is, the energy storage system is capable of performing energy interaction with the electric device and/or the power supply device. Alternatively, if the input voltage of the energy storage system does not meet the second specified condition, then the judging in S201 is continued, until the input voltage of the energy storage system meets the second specified condition, and the energy storage system is automatically started.

For example, in an implementation, if it is determined that the input voltage of the energy storage system meets the second specified condition, a control hardware circuit is self-locked, at this time, the energy storage system can lock the input of the power supply, as a result, even the external bus is cut off from the power supply, the energy storage system can still perform energy interaction, based on its own energy, with the electric device and/or the power supply device. As such, the energy storage system has accomplished self-starting. During normal operation of the energy storage system, the hardware circuit must be in a locked state, that is, the self-lock signal much be in an "enabled" state, otherwise, once the external power supply device stops supplying electric energy, the electric energy supply by the energy storage system to the electric device will be cut off accordingly, thus the energy storage system cannot further supply electric energy to the electric device, resulting in power down.

In the present embodiment, considering the possible factor of unstable input voltage of the energy storage system, the energy storage system will not be directly started after the input voltage meets the first specified condition, but will be started after the second specified condition is judged to be satisfied and it is determined that the input voltage is stable and safe, thereby avoiding malfunctions such as abnormal operation and the like of the energy storage system due to unstable input voltage, and guaranteeing stability and safety of the energy storage system.

Moreover, in the present embodiment, after the energy storage system is started, it is detected that whether the input voltage of the energy storage system is abnormal or not.

Specifically, detecting whether the input voltage of the energy storage system is abnormal or not can include, but not limited to, the following two manners:

Manner 1: detecting whether the input voltage of the energy storage system meets the second specified condition within a second duration, if yes, then it is determined that the input voltage is normal; if not, then it is determined that the input voltage is abnormal.

Specifically, the second specified duration can be preset according to actual demands, for example, the second specified duration can be 3s-5s.

Manner 2: detecting whether the input voltage of the energy storage system is a negative value, if yes, then it is determined that the input voltage is abnormal.

Specifically, if it is detected that the input voltage of the energy storage system is a negative value, that is, the polarity is reversed, then it is determined that the input voltage is abnormal; if it is detected that the input voltage of the energy storage system is not a negative value, then it is determined that the input voltage is normal.

Specifically, in the present embodiment, if it is determined that the input voltage of the energy storage system is abnormal, then a protecting process or an alarming process may be performed for the energy storage system.

Specifically, the protecting process can include, but not limited to, stopping energy interaction between the energy storage system and other devices.

For example, as shown in FIG. 1, if it is determined that the input voltage of the energy storage system is abnormal, the energy interaction between the energy storage system and the electric device is stopped, then the energy storage system will not supply electric energy to the electric device; at the same time, the energy interaction between the energy storage system and the power supply device is also stopped, then the power supply device will not supply electric energy to the energy storage system.

Specifically, in an implementation, if the energy storage system includes a discharging switch configured to control discharging and a charging switch configured to control charging, then performing the protecting process can include: switching off the charging switch and the discharging switch of the energy storage system at the same time, so that the energy storage system cannot perform energy interaction with other devices, thereby further protecting the energy storage system.

Specifically, performing the alarming process can include, but not limited to, outputting alarming information and/or outputting an alarming signal. The alarming information is used for reminding a maintenance staff that the input voltage of the energy storage system is abnormal, so that the maintenance staff can maintain the system according to the output alarming information. The alarming signal can include, but not limited to, at least one of sound alarming signal and light alarming signal.

The technical solutions recorded in the present embodiment can have at least the following beneficial effects:

In the starting method provided by the present embodiment, when an input voltage of an energy storage system meets a first specified condition, judging whether the input voltage meets a second specified condition, if yes, then starting the energy storage system. It can be automatically judged that whether the input voltage of the energy storage system meets the preset starting conditions, and if the input voltage of the energy storage system meets the preset starting conditions, the energy storage system will be automatically started. Such a process can be accomplished automatically without manual operation, which increases starting efficiency and, on the other hand, avoids labor cost caused by manual operation in the prior art. Therefore, the technical solution provided by the present embodiment solves the problems of poor starting efficiency and high cost in the prior art.

Embodiment Two

Figure 3:
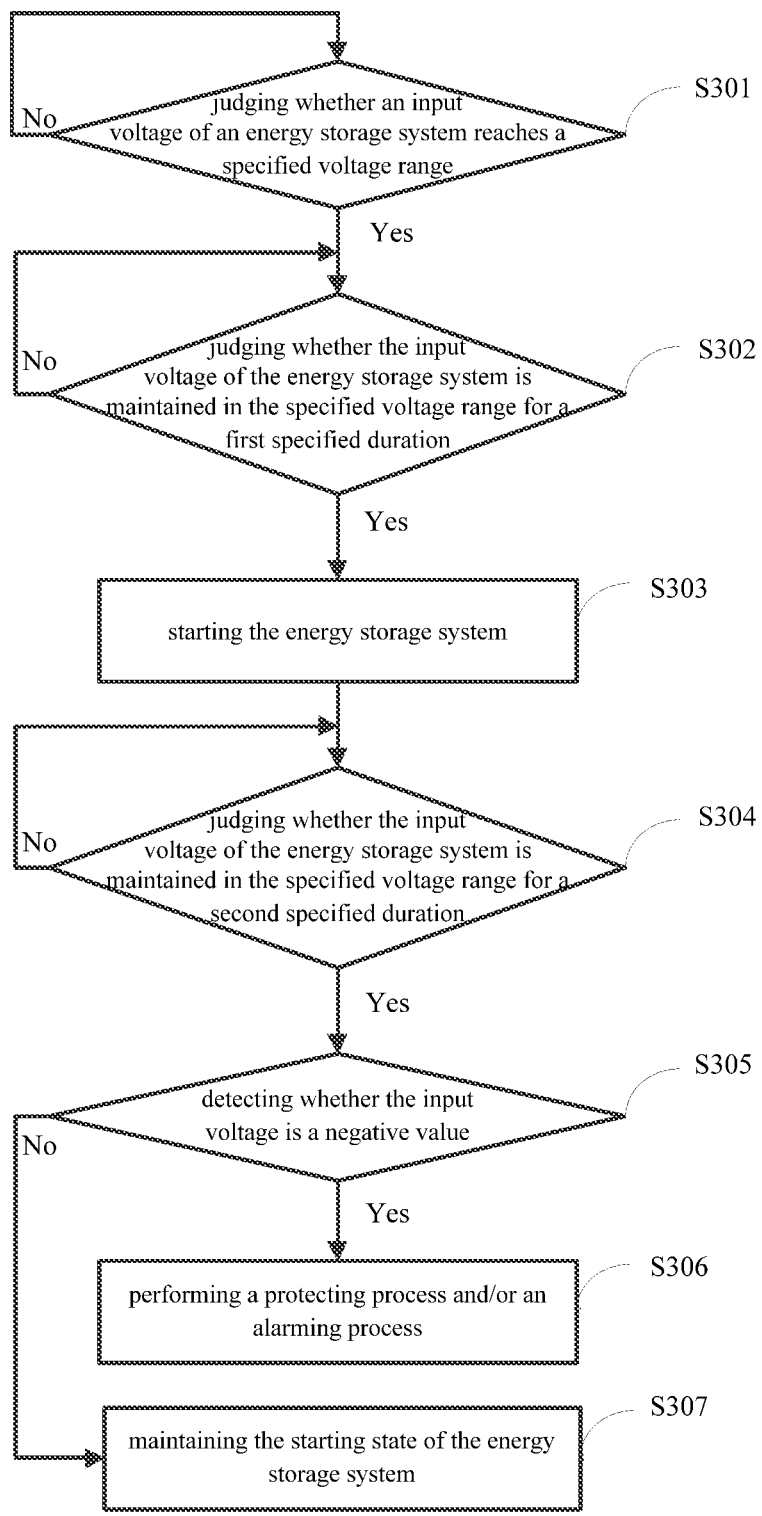
FIG. 3 is a second flow diagram of a starting method according to an embodiment of the present application.

Embodiment Two of the present application provides a starting method. Please refer to FIG. 3, which is a second flow diagram of a starting method according to the present embodiment of the present application. As shown in FIG. 3, the method includes steps as follows:

S301, judging whether an input voltage of an energy storage system falls into a specified voltage range; if yes, going to step S302; if not, going to S301.

S302, judging whether the input voltage of the energy storage system is maintained in the specified voltage range within a first specified duration; if yes, going to step S303; if not, going to S302.

S303, starting the energy storage system.

S304, judging whether the input voltage of the energy storage system is maintained in the specified voltage range within a second specified duration; if yes, going to step S305; if not, going to S306.

S305, detecting whether the input voltage is a negative value; if yes, going to S307; if not, going to S306.

S306, performing a protecting process and/or an alarming process.

S307, maintaining the energy storage system in a started state.

Those details which are not illustrated in the present embodiment can be referred to the relevant description of Embodiment One as above.

The technical solutions recorded in the present embodiment of the present application can have at least the following beneficial effects:

In the present embodiment, it can be automatically judged whether the input voltage of the energy storage system meets the preset starting conditions, and if the input voltage of the energy storage system meets the preset starting conditions, the energy storage system will be automatically started. Such a process can be accomplished automatically without manual operation, which increases starting efficiency and, on the other hand, reduces labor cost caused by manual operation in the prior art. Therefore, the technical solution provided by the present embodiment of the present application solves the problems of poor starting efficiency and high cost in the prior art.

Embodiment Three

Based on the starting method described in Embodiment One, Embodiment Three further provides a starting device for implementing the steps in the above starting method.

Figure 4:
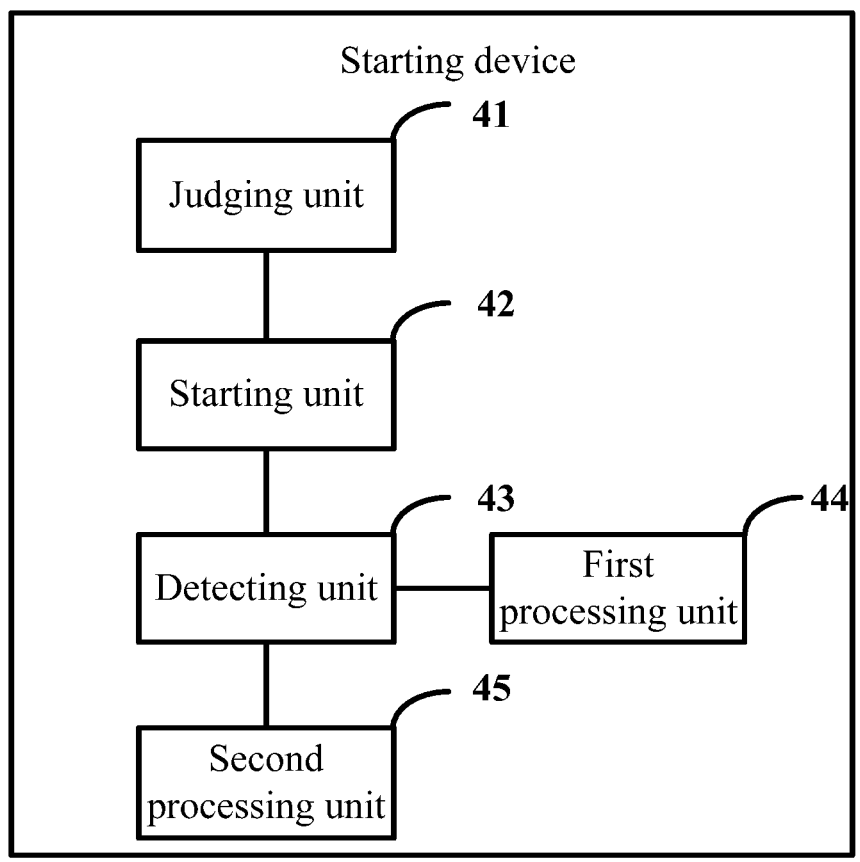
FIG. 4 is a functional block diagram of a starting device according to an embodiment of the present application.

Please refer to FIG. 4, which is a functional block diagram of a starting device according to the present embodiment. As shown in FIG. 4, the device includes:

a judging unit 41, configured to, when an input voltage of an energy storage system meets a first specified condition, judge whether the input voltage meets a second specified condition;

a starting unit 42, configured to start the energy storage system, in response to a condition that the input voltage meets the second specified condition.

Specifically, in the present embodiment, the first specified condition includes: the input voltage of the energy storage system falls into a specified voltage range.

Specifically, in the present embodiment, the second specified condition includes: the input voltage of the energy storage system is maintained in the specified voltage range within a first specified duration.

Specifically, in the present embodiment, the device further includes:

a detecting unit 43, configured to detect whether the input voltage is abnormal.

Specifically, in an embodiment of the present application, the device further includes:

a first processing unit 44, configured to, after the detecting unit 43 determines that the input voltage is abnormal, perform a protecting process; and/or a second processing unit 45, configured to, after the detecting unit 43 determines that the input voltage is abnormal, perform an alarming process.

Since the units in the present embodiment can implement the starting method described in Embodiment One, those details which are not illustrated in the present embodiment can be referred to the relevant description of Embodiment One as above.

The technical solutions recorded in the present embodiment of the present application can have at least the following beneficial effects:

In the starting device provided by the present embodiment, the judging unit of the starting device is configured to, when an input voltage of an energy storage system meets a first specified condition, judge whether the input voltage meets a second specified condition, and the starting unit is configured to start the energy storage system, in response to a condition that the input voltage meets the second specific condition. In the present embodiment, it can be automatically judged whether the input voltage of the energy storage system meets the preset starting conditions, and if the input voltage of the energy storage system meets the preset starting conditions, the energy storage system will be automatically started. Such a process can be accomplished automatically without manual operation, which increases starting efficiency and, on the other hand, avoids labor cost caused by manual operation in the prior art. Therefore, the technical solution provided by the present embodiment solves the problems of poor starting efficiency and high cost in the prior art.

It should be understood that, in the embodiments of the present application, the disclosed system, device and method can be implemented in other manners. The device embodiments described as above are merely exemplary. For example, the division of the units is merely a logical function division, and during practical implementation, there may be other division manners. For example, multiple units or components can be combined or integrated into another system, or some of the features can be omitted or not executed. In addition, the mutual coupling or direct coupling or communicational connection shown or discussed can be implemented by interfaces, or by indirect coupling or communicational connection between devices or units, which can be achieved in an electrical manner, a mechanical manner or other manners.

The units illustrated as separated components can be or not be physically separated, components shown as units can be or not be physical units, that is, they can be located at a same place or distributed in a plurality of network units. According to actual demands, part or all of the units can be used to implement the technical solutions of the embodiments.

Moreover, the functional units of each embodiment of the present application can be integrated in a processing unit, or physically provided as individual units, or at least two of them can be integrated in a unit. The above integrated unit can be implemented in a manner of hardware, or in a manner of a combination of hardware and software functional units.

The units integrated in the manner of software functional units can be stored in a computer readable storage medium. The above software functional units are stored in a storage medium, which include a plurality of instructions configured to instruct a computer device (PC, server or network device etc.) or a processor to perform a part of the steps included in the method embodiments of the present application. The above-mentioned storage medium includes mediums capable of storing programming codes, such as universal serial bus (Universal Serial Bus, USB) flash disk, mobile hard disk drive (Hard Disk Drive, HDD), read-only memory (Read-Only Memory, ROM), random access memory (Random Access Memory, RAM), magnetic disk or optical disk.

The above described embodiments are preferred embodiments of the present application, which cannot limit the present application. Any modification, equivalent replacement and improvement made within the spirit and principle of the present application shall fall into the protection scope of the present application.

What is claimed is:

1. A starting method, comprising:
    after an input voltage of an energy storage system meets a first specified condition, judging, by the energy storage system, whether the input voltage meets a second specified condition; and
    starting the energy storage system, in response to a condition that the input voltage meets the second specified condition,
    wherein the first specified condition is met when the input voltage of the energy storage system increases from smaller than a minimum voltage of a preset specified voltage range to the minimum voltage and falls into the specified voltage range, and
    wherein the second specified condition is met when the input voltage is maintained in the specified voltage range within a first specified duration.

2. The method of claim 1, wherein after starting the energy storage system, the method further comprising:

detecting, by the energy storage system, whether the input voltage is abnormal.

3. The method of claim 2, wherein after detecting that the input voltage is abnormal, the method further comprising:
performing, by the energy storage system, a protecting process; and/or,
performing, by the energy storage system, an alarming process.

4. A starting device, comprising:
a judging unit, configured to, after an input voltage of an energy storage system meets a first specified condition, judge whether the input voltage meets a second specified condition; and
a starting unit, configured to start the energy storage system, in response to a condition that the input voltage meets the second specified condition,
wherein the first specified condition is met when the input voltage of the energy storage system increases from smaller than a minimum voltage of a preset specified voltage range to the minimum voltage and falls into the specified voltage range; and
wherein the second specified condition is met when the input voltage of the energy storage system is maintained in the specified voltage range within a first specified duration.

5. The device of claim 4, further comprising:
a detecting unit, configured to detect whether the input voltage is abnormal.

6. The device of claim 5, further comprising:
a first processing unit, configured to, after the detecting unit determines that the input voltage is abnormal, perform a protecting process; and/or,
a second processing unit, configured to, after the detecting unit determines that the input voltage is abnormal, perform an alarming process.

7. The method of claim 1, wherein the starting the energy storage system, in response to a condition that the input voltage meets the second specified condition, comprises:
when it is determined that the input voltage of the energy storage system meets the second specified condition, a control hardware circuit of the energy storage system is self-locked.

8. The method of claim 1, wherein a starting time of the first specified duration is a time point when the input voltage of the energy storage system meets the first specified condition for a second time.

9. The device of claim 4, wherein the starting unit is further configured to, when the judging unit determined that the input voltage of the energy storage system meets the second specified condition, enable a control hardware circuit of the energy storage system to be self-locked.

10. The device of claim 4, wherein a starting time of the first specified duration is a time point when the input voltage of the energy storage system meets the first specified condition for a second time.

11. A starting method of an energy storage system in a harsh environment, comprising:
judging whether an input voltage of the energy storage system increases from a voltage smaller than a minimum voltage of a preset specified voltage range to or exceed the minimum voltage range and falls into the specified voltage range;
after determining that the input voltage of the energy storage system falls into the specified voltage range, further judging whether the input voltage is maintained in the specified voltage range within a first specified duration; and
after determining that the input voltage of the energy storage system is maintained in the specified voltage range within the first specified duration, automatically starting the energy storage system.

* * * * *